United States Patent
Bigand et al.

(10) Patent No.: US 9,939,946 B2
(45) Date of Patent: Apr. 10, 2018

(54) SECURING A DATA INPUT DEVICE

(71) Applicant: THALES, Courbevoie (FR)

(72) Inventors: Jean-Louis Bigand, Vendome (FR); Michaël Manceau, Chateaudun (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/808,926

(22) Filed: Jul. 24, 2015

(65) Prior Publication Data

US 2016/0026317 A1    Jan. 28, 2016

(30) Foreign Application Priority Data

Jul. 25, 2014 (FR) ..................... 14 01714

(51) Int. Cl.
| G06F 3/045 | (2006.01) |
| G06F 3/041 | (2006.01) |
| G06F 1/16 | (2006.01) |
| G06F 3/01 | (2006.01) |
| G06F 3/023 | (2006.01) |

(52) U.S. Cl.
CPC .......... *G06F 3/0414* (2013.01); *G06F 1/1616* (2013.01); *G06F 3/016* (2013.01); *G06F 3/017* (2013.01); *G06F 3/0234* (2013.01); *G06F 3/0416* (2013.01); *G06F 3/0418* (2013.01); *G06F 2203/04105* (2013.01); *G06F 2203/04808* (2013.01)

(58) Field of Classification Search
CPC ......... G06F 1/1616; G06F 2203/04105; G06F 2203/04808; G06F 3/016; G06F 3/017; G06F 3/0234; G06F 3/0414; G06F 3/0416; G06F 3/0418
See application file for complete search history.

(56) References Cited

U.S. PATENT DOCUMENTS

| 2004/0108995 A1* | 6/2004 | Hoshino | ................ F16M 11/10 345/173 |
| 2014/0092064 A1* | 4/2014 | Bernstein | ................ G06F 3/016 345/174 |

FOREIGN PATENT DOCUMENTS

| DE | 10 2012 203831 A1 | 9/2013 |
| JP | 2000-311052 A | 11/2000 |
| WO | 2010/009552 A1 | 1/2010 |
| WO | 2014/049219 A1 | 4/2014 |

\* cited by examiner

*Primary Examiner* — Insa Sadio
(74) *Attorney, Agent, or Firm* — Baker & Hostetler LLP

(57) ABSTRACT

The securing of a data input device of a computer system including a screen, the device including a touch-sensitive surface allowing an object displayed on the screen to be designated, and a switch operable by pressing the touch-sensitive surface, the operation of the switch allowing a designated object to be selected. The device furthermore includes means for measuring a force applied to the touch-sensitive surface and intended to operate the switch. The measurement means are independent from the switch.

9 Claims, 3 Drawing Sheets

SECURING A DATA INPUT DEVICE

CROSS-REFERENCE TO RELATED APPLICATIONS

This application claims priority to foreign French patent application No. FR 1401714, filed on Jul. 25, 2014.

BACKGROUND TO THE INVENTION

The invention relates to the securing of a data input device of a computer system. Many data input devices may be associated with a computer system. The present invention focuses in particular on touch-sensitive surfaces such as, for example, those used in a portable microcomputer, well known by the name of "touchpad" for a touch-sensitive surface without a screen, or "touchscreen" for a touch-sensitive surface with a screen. These surfaces may or may not be fitted with a screen. A touch-sensitive surface is generally used to point at an object displayed on a screen of the computer system. To do this, a user moves a finger over the touch-sensitive surface. The movement of the finger is detected by the touch-sensitive surface and is reproduced on the surface of the screen. The object pointed at may be a virtual button displayed on the screen or a datum which the user wishes to input. The user may be required to select the object pointed at. This selection operation may be performed by pressing a real button disposed close to the touch-sensitive surface or by pressing directly on the touch-sensitive surface itself. A switch actuated by the button or by pressing the touch-sensitive surface generates electrical information enabling the selection.

The invention is particularly useful in aeronautics for a touch-sensitive surface belonging to a system installed on-board an aircraft. The system includes one or more screens disposed on the instrument panel of an aircraft, a computer and one or more data input devices, including, for example, a touch-sensitive surface. The touch-sensitive surface may be used to select flight parameters displayed on the screen of the system or more generally to point at and select objects displayed on the screen of the system.

The aircraft may be subjected to turbulence which risks interfering with the pointing at and selection of the objects. More precisely, turbulence generates vibrations which may cause uncontrolled movements of the selection means. Even in the absence of established turbulence, slight acceleration phenomena to which the system is subjected may interfere with the selection of objects pointed at by the touch-sensitive surface.

The presence of an object such as, for example, a drop of water, an insect, a pen, a shirt or jacket sleeve of an operator on the touch-sensitive surface in vibratory environments may be enough to trigger the selection switch.

Attempts have been made to secure the data input device by avoiding the inadvertent triggering of the selection switch by adding a switch lock in series with said switch. The unlocking of the switch is subject to certain conditions such as the fact that the selection is compatible with an area of the touch-sensitive surface valid for a selection, or that the vibratory level is sufficiently low to enable the correct activation of the touch-sensitive surface and the switch.

This locking solution has a number of disadvantages, such as the definition of predefined areas limiting the use of the complete touch-sensitive surface, or such as blocked usage periods in vibratory environments, shocks or significant constant accelerations.

More generally, the locking device is disposed in series with the switch (upstream or downstream) and acts on the electrical information originating from the switch.

SUMMARY OF THE INVENTION

The invention aims to overcome some or all of the aforementioned problems by proposing a means for securing the data input implemented by means of a touch-sensitive surface, these means being dissimilar and segregated in relation to the validation switch. More precisely, the dissimilar aspect is obtained by means of a measurement of a pressing force on the touch-sensitive surface, the measurement not being carried out by the selection switch. The segregation is implemented by means of a parallelisation of the force measurement in relation to the electrical information originating from the selection switch, and not a serialisation as in the locking means connected in series with the switch.

For this purpose, the subject-matter of the invention is a data input device of a computer system including:

a screen, a touch-sensitive surface allowing the designation of an object displayed on the screen, a switch operable by pressing the touch-sensitive surface, the operation of the switch allowing a designated object to be selected, means for measuring a force applied to the touch-sensitive surface and intended to operate the switch, the measurement means being independent from the switch, a comparator of a force measured by the measurement means with a plurality of distinct reference forces, and means for validating a signal originating from the switch according to results of comparisons carried out by the comparator between the measured force and the distinct reference forces.

The segregation and dissimilarity of the two information elements, the force measurement and the electrical signal originating from the selection switch, ensure that a breakdown on a chain generating one of the information elements does not cause a breakdown of the chain associated with the other information element.

The fact of carrying out a comparison with a plurality of distinct reference forces allows the validation to be made more robust, notably when the device is located in a vibratory environment.

BRIEF DESCRIPTION OF THE FIGURES

The invention will be better understood and other advantages will become evident from a reading of the detailed description of an embodiment given by way of example, said description being illustrated by the attached drawing, in which.

For the sake of clarity, the same elements will be denoted with the same references in the different figures.

DETAILED DESCRIPTION OF THE INVENTION

Figure 1:
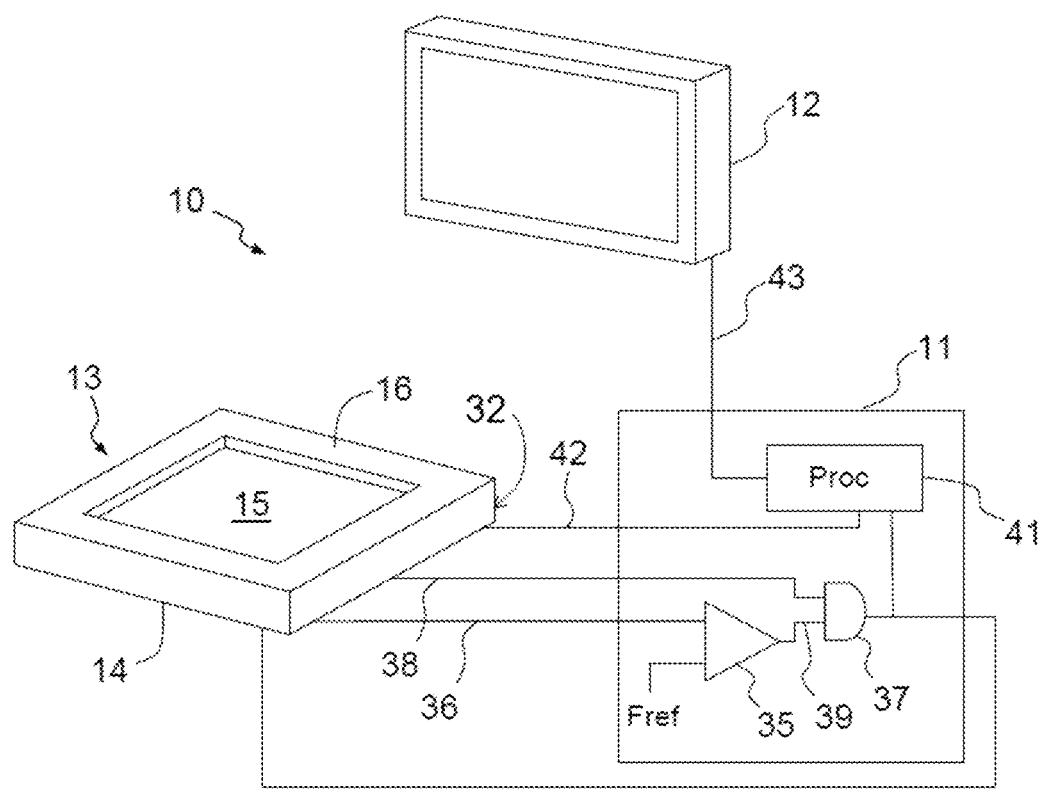
FIG. 1 shows schematically a computer system in which the invention is implemented.

FIG. 1 shows a computer system 10 shown schematically and including a central unit or computer 11, a screen 12 and a data input device 13 having a touch-sensitive surface.

The invention is particularly useful in the aeronautical domain and more particularly in a cockpit of an aircraft. Most aircraft are controlled by a pilot and a co-pilot. In the cockpit, a plurality of flight or navigation instruments can be likened to a computer system. The screen 12 is placed on the instrument panel under the canopy of the aircraft cockpit. Other devices providing a display can be likened to a screen such as, for example, a projector enabling a head-up display for the aircraft pilot. The computer 11 can be disposed behind the front face of the instrument panel or remotely in a rack provided to accommodate it. This type of rack is disposed, for example, in a rear area of the cockpit or even outside the cockpit in a space provided for this purpose. The data input device 13 can be disposed between the pilot and the co-pilot, for example in order to enter navigation information, notably to input the coordinates of the upcoming checkpoints that the aircraft must follow. More generally, the term "computer system" is to be interpreted in the broad sense wherein it includes a computer, a screen and a data input device, regardless of the function performed by the computer system. The touch-sensitive surface 15 implemented in the data input device may obviously be used for any type of input that a user may be required to perform into the computer system.

The data input device 13 includes a body 14 and a touch-sensitive surface 15. The body 14 is intended to be laid on or attached to a work surface (not shown). The touch-sensitive surface 15 may be flush with a flat surface 16 of the body 14 or may be disposed in a slightly lowered manner so that its outlines can be distinguished by touch. The touch-sensitive surface 15 is translationally movable in relation to the body 14, the translational movement of the touch-sensitive surface 15 enabling the operation of a switch 17 disposed between the touch-sensitive surface 15 and the body 14.

A user moves a finger over the touch-sensitive surface 15 in order to designate an object on the screen 12. The touch-sensitive surface 15 includes a set of sensors allowing the position of the finger on the touch-sensitive surface 15 to be defined. The touch-sensitive surface 15 may have a square or rectangular outline and the set of sensors supplies information relating to the position of the finger of the user in a reference frame on the touch-sensitive surface 15, the axes of which may be parallel to the sides of the touch-sensitive surface 15. The movement of the finger of the user over the touch-sensitive surface 15 is translated by an equivalent movement of a pointer on the screen 12. The passing of the pointer over an object shown on the screen allows it to be designated. This designation is similar to that obtained by a mouse or joystick.

Figure 2:
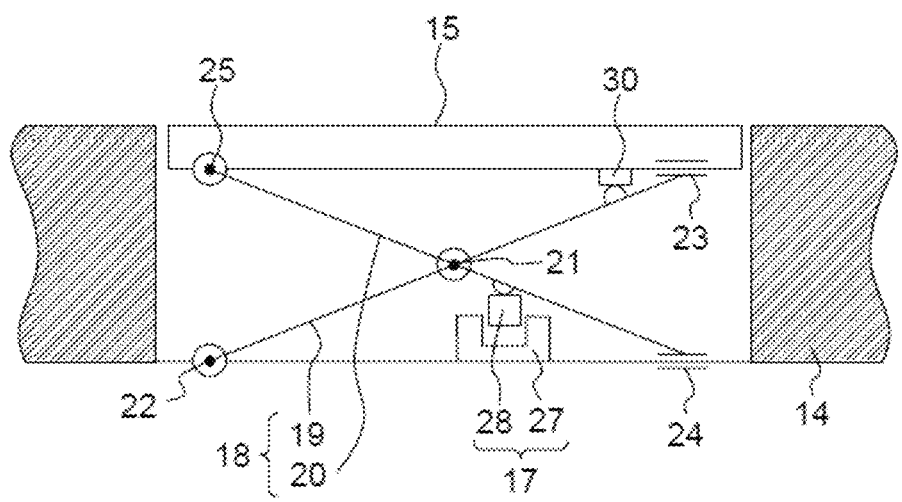
FIG. 2 shows schematically an example of a data input device implementing the invention.

FIG. 2 shows a cross-section view of the data input device 13 in a plane perpendicular to the touch-sensitive surface 15. The data input device 13 includes a switch 17 operable by pressing the touch-sensitive surface 15, the operation of the switch 17 allowing the selection of an object designated by the movements of the finger of a user over the touch-sensitive surface 15. Selection is also understood to mean validation. Selection means any action allowing the identification of a particular object that has been designated. It may entail a choice from a plurality of values displayed on the screen 12, a pressing of a virtual button displayed on the screen 12, the choice of a particular point of a drawing displayed on the screen, etc. The touch-sensitive surface 15 is pressed by the finger more or less perpendicular to the touch-sensitive surface 15. The switch 17 is situated under the touch-sensitive surface 15. It is disposed in such a way as to be operated by depressing the touch-sensitive surface 15 in relation to the flat surface 16.

The data input device 13 advantageously includes a pantograph 18 disposed between the body 14 and the touch-sensitive surface 15 in such a way as to transfer any force exerted perpendicular to the touch-sensitive surface 15 towards the switch 17. Thus, regardless of the position of the finger of a user on the touch-sensitive surface 15, when the user presses the touch-sensitive surface 15 with his finger, his press is transmitted uniformly towards the switch 17. The pantograph 18 includes, for example, two rigid bars 19 and 20 articulated in relation to one another more or less in their middle 21 and allowing a degree of rotational freedom in relation to one another. The bar 19 is articulated on a first of its ends 22 in relation to the body 14, allowing a degree of rotational freedom, and is articulated on a second of its ends 23 in relation to the touch-sensitive surface 15, allowing a degree of translational freedom. The bar 20 is articulated on a first of its ends 24 in relation to the body 14, allowing a degree of translational freedom, and is articulated on a second of its ends 25 in relation to the touch-sensitive surface 15, allowing a degree of rotational freedom. The axes of the different degrees of rotational freedom are parallel to one another (perpendicular to the plane of FIG. 2). The axes of the two degrees of translational freedom are parallel to the touch-sensitive surface 15 and perpendicular to the axes of the degrees of rotational freedom. The axes of the two degrees of translational freedom are in the plane of FIG. 2. The switch 17 includes a fixed part 27 rigid with the body 14 and a mobile part 28 which one of the bars, here the bar 20, can press when the touch-sensitive surface 15 is pressed by the finger of a user. The switch 17 may have dual stiffness as described, for example, in patent application WO 2014/049219 filed in the name of the applicant. A return spring (not shown) can push back the touch-sensitive surface 15 of the body 14 in a direction opposite to that of the pressing by the finger of the operator. Springs compensating for the weight of the touch-sensitive surface 15 can also be implemented. The position of these springs is a function of the orientation of the touch-sensitive surface 15 in relation to the vertical. When the touch-sensitive surface 15 is pressed, the switch 17 toggles.

According to the invention, the data input device 13 includes means for measuring the force applied to the touch-sensitive surface 15. These measurement means are independent from the switch 17.

It is possible to dispose a force sensor 30 between the touch-sensitive surface 15 and the body 14. The sensor 30 may be a piezoelectric sensor disposed between one of the bars, for example the bar 20, and the body 14. It is also possible to position a deformation gauge on one of the bars. The piezoelectric sensor or the deformation gauge provides information on the value of the force really exerted on the touch-sensitive surface 15.

Alternatively, it is possible to do without a sensor 30. The designation of an object by the touch-sensitive surface 15 and the measurement of the force advantageously both apply the same physical principle. More precisely, the device includes a position sensor 32, or a set of position sensors, allowing the position of a finger of the user on the touch-sensitive surface 15 to be determined. The device is configured so that the signal originating from the sensor 32 or from the set of sensors is processed not only to determine the position of the finger of the user on the touch-sensitive surface 15, but also to determine the force exerted on the touch-sensitive surface 15 by the user at the determined position. The dual use of the signal obviously allows the cost of the device to be reduced by reducing the number of sensors. Above all, this dual use prevents the inertia of the touch-sensitive surface 15 from interfering with a force sensor 30 outside the touch-sensitive surface 15 when the device is in a vibratory environment.

For example, the touch-sensitive surface 15 may be a resistive panel. It is then possible to use a resistance measurement depending on the pressure exerted on the panel in order to determine indirectly the force exerted on the panel perpendicular to the latter. Similarly, a capacitive-effect panel can be implemented in order to perform the designation. It is possible to measure a capacitance depending on the force exerted on the panel. In a surface-wave panel, a finger placed on the panel absorbs a part of the surface wave. The wave is compared with a reference value. Changes are detected and a position coordinate on the panel is determined. This measurement is performed according to two axes X and Y in order to obtain the position of the finger on the panel. The absorbed wave quantity can also be defined according to an axis Z perpendicular to the panel. This quantity allows the pressure exerted on the panel at the X-Y coordinate and therefore the force exerted by the finger to be determined.

Figure 3:
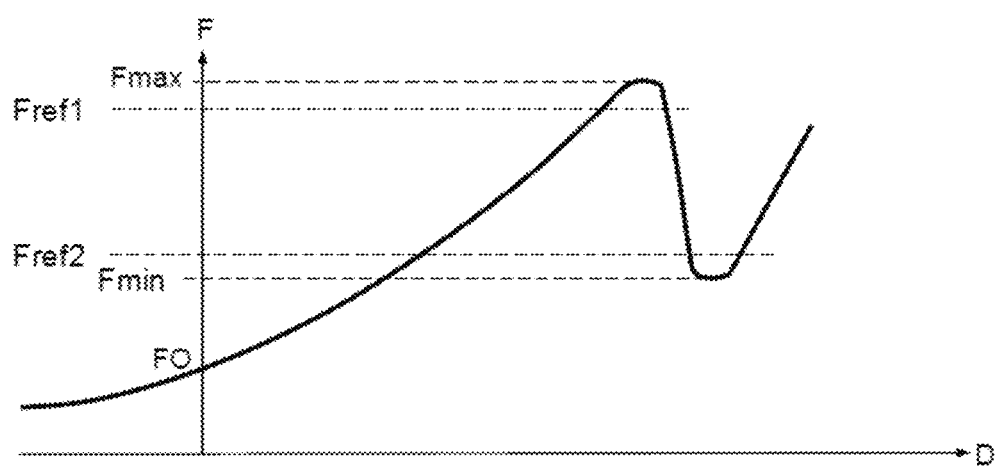
FIG. 3 shows an example of the relationship between force and movement in a switch belonging to the device shown in FIG. 1.

FIG. 3 shows an example of the relationship between the force F and the movement D in the switch 17 between its mobile part 28 and its fixed part 27. The switch 17 may be pre-tensioned in such a way that, for a zero movement, the force F to be exerted on the mobile part 28 has a positive value F0. From this zero movement, the force F increases until it reaches a maximum force Fmax. By continuing the depression of the mobile part 28, the force F decreases. For example, by implementing a dome switch, this decrease in the force F corresponds to the depression of the dome. The toggling of the switch 17, toggling from an open state to a closed state or vice versa, is obtained during this depression, thereby ensuring a clear toggle. At the end of the depression, the force F attains a value Fmin. Beyond this depression, the force F again increases with the movement D.

The force measurement enables validation that the toggling of the switch 17 is in fact due to a pressing of the touch-sensitive surface 15.

The data input device includes a comparator 35 of a force measured 36 by the measurement means with a reference force Fref and means 37 for validating a signal originating from the switch 17 according to the result of the comparison carried out by the comparator 35. In other words, the comparator 35 authorises the validation of the toggling of the switch 17 according to a condition. This condition may simply be that the force measured is greater than the reference force Fref. It is possible to define a more complex condition such as, for example: the force measured lies between two predefined forces in relation to 0.8 times Fref and 4 times Fref. These coefficients are obviously given only by way of example.

The comparator 35 and the validation means 37 may belong to the computer 11 or may be integrated into the body 14. The validation means 37 are represented by a cell ET receiving an electrical signal 38 originating from the switch 17 and a signal 39 originating from the comparator 35.

The validation means 37 deliver a signal 40 to a processor 41 which also receives a designation signal 42 originating from position sensors of the touch-sensitive surface 15. The processor 41 processes the two signals and forms a video signal 43 intended for the screen 12. The processor 41 generates a certain number of objects displayed by the screen 12. The processor 41 insets into the images that it generates an image of a pointer, the position of which is defined by the designation signal 42. This pointer allows the designation of displayed objects. The selection of the designation, following validation and carried by the signal 40, may be taken into account in the images generated by the processor 41.

The functions performed by the comparator 35 and by the validation means 37 may be performed by the processor 41.

The value of the reference force Fref can be fixed during the design of the device. This value is a function of the force Fmax of the switch 17 used in the data input device 13. The value of the reference force Fref takes account of a tolerance on the real value of the switch 17. It is possible to define values of the reference force Fref that are variable according to the coordinates measured by the touch-sensitive surface 15 itself. In fact, the transmission of the force between the touch-sensitive surface 15 and the switch 17 may vary according to the position of the finger of the operator on the touch-sensitive surface 15. A mapping of the reference force Fref is advantageously produced for this purpose. In other words, the reference force Fref is defined according to the position of the pressing on the touch-sensitive surface 15.

The value of the reference force Fref is advantageously variable during the lifetime of the data input device 13, notably in order to take into account the ageing of the switch 17. It is in fact normal for the forces Fmax and Fmin of a switch to decrease with the number of toggles carried out. To this end, the device includes means for calibrating the reference force Fref according to a force measured during a toggling of the switch 17. This measured force may be Fmax or Fmin or possibly both. This calibration function may be performed by the processor 41. The calibration may, for example, take place at the request of an operator or during each new powering up of the data input device 13. On board an aircraft, the powering up of a device generally takes place only when the aircraft is on the ground. It is then certain that the aircraft is not subjected to any vibration which could cause an inadvertent toggling of the switch 17. Following this powering up, during the first pressing of the switch 17, the force Fmax necessary for performing the toggling of the switch 17 is measured and the value of the reference force Fref is fixed according to this measured force and a tolerance.

Furthermore, during a comparison between a measured force and the reference force Fref, the latter can be fixed. For example, if an exceeding of the reference force Fref is detected at the time of the toggling of the switch 17, the toggling of the switch 17 is then validated. This entails a validation at a precise time, the time of the toggling of the switch 17 from a state where the touch-sensitive surface 15 is released to a state where the touch-sensitive is depressed. The choice of an instantaneous comparison with a fixed value of the reference force Fref may have some disadvantages. In fact, an inappropriate and sufficiently heavy object may fall onto the touch-sensitive surface 15 and simultaneously cause the toggling of the switch 17 and the validation of the toggling due to the weight of this object. A vibratory environment may affect the touch-sensitive surface 15 due to its inertia and may operate the switch 17. Even a lightweight object laid onto the touch-sensitive surface 15 in contact with vibrations could cause an inappropriate validation. It is possible to guard against this type of situation by causing the value of the reference force Fref to vary during the time of the toggling of the switch 17. More precisely, during the pressing of the touch-sensitive surface 15, the user supplies a force whose value changes over time according to the curve shown in FIG. 3. The probability that an object falling onto the touch-sensitive surface 15 will follow this curve is very low. The temporal progression of the force exerted by a user may be highly variable from one user to another. Two envelope curves can be defined between which the user must be located. The timing of these curves is determined in relation to the toggling of the switch 17. More simply, it is possible to distinguish the two toggles of the switch 17, the first toggle taking place during the pressing of the touch-sensitive surface 15 and the second toggle taking place during the release of the pressing. The residual force exerted by the user during the second toggle is less than the force exerted during the first toggle. These two toggling forces can be predefined and can both be used for comparison with a real force exerted on the touch-sensitive surface 15. In other words, the device includes a comparator of a force measured by the measurement means with two distinct reference forces Fref1 and Fref2, one corresponding to a toggling of the switch 17 during a pressing of the touch-sensitive surface 15, the other corresponding to a toggling of the switch 17 during a release of the pressing of the touch-sensitive surface 15. The validation is effective only if the comparator 35 successfully detects a force applied to the touch-sensitive surface equal to the first reference force Fref1 then to the second reference force Fref2. It is possible to assign to each of the reference forces a tolerance within which the measured force is considered as equal to the reference force. This tolerance may include a single limit only. For example, for a switch whose curve is shown in FIG. 3, the validation may be effective if the force applied is greater than Fref1 then if the force applied is less than Fref2. It is obviously possible to define other temporal comparison sequences according to the type of switch that is chosen. It is possible to compare the measured force with more than two reference forces. More generally, the validation means 37 are configured to validate the signal 38 originating from the switch 17 if a temporal sequence of the results of the comparisons with each of the reference forces conforms with a reference temporal sequence.

As previously, it is possible to calibrate the different reference forces Fref1 and Fref2 during the lifetime of the data input device 13.

The data input device 13 advantageously includes means generating sensory feedback intended to inform the user of the selection of an object. It is important to inform the user only when the validation of the designation is effective. The means generating sensory feedback are controlled by the validation means 37.

The sensory feedback may assume a plurality of forms. It may be tactile. A sensation has already been obtained through the toggling of the switch 17. It is possible to add additional feedback to it during the validation of the toggle. When the pressing of the switch 17 is normally carried out by the user, the additional feedback coincides with the toggling of the switch 17. This additional tactile feedback can be obtained by means of a vibration generated towards the touch-sensitive surface 15.

The sensory feedback may be visual, wherein the feedback can be displayed on the screen 12, on the touch-sensitive surface 15, for example by a colour change, or on a remote indicator light.

The sensory feedback may be audible, by means of a sound emitted during the validation.

Figure 4A:
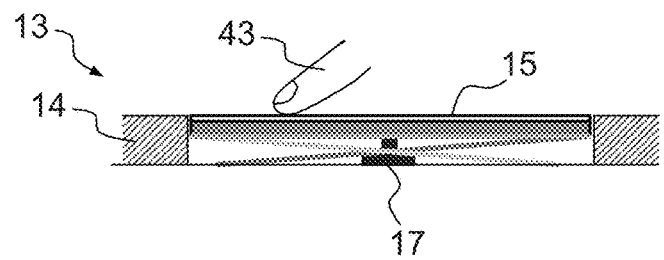
FIGS. 4a, 4b and 4c show the use of the device shown in FIG. 1 by the finger of a user.
Figure 4B:
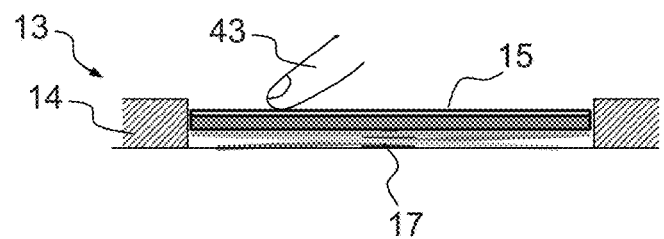
Figure 4C:
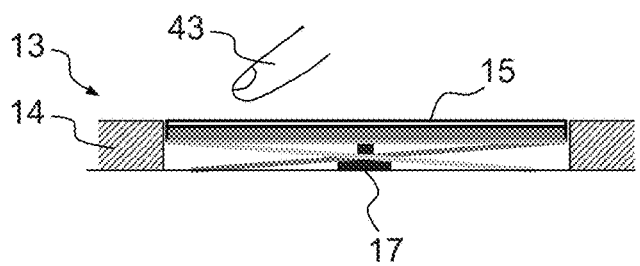

FIGS. 4a, 4b and 4c show the use of the data input device 13 by the finger 43 of a user. More precisely, in FIG. 4a, the user positions his finger 43 on the touch-sensitive surface 15. Sensory feedback may possibly indicate that the positioning of the finger is correct.

In FIG. 4b, the user carries out a more pronounced pressing of the touch-sensitive surface 15, which then activates the switch 17. When the switch 17 is activated, the data input device 13 checks for consistency with the force exerted by the user on the touch-sensitive surface 15 and activates the means generating sensory feedback. Different sensory feedback may be defined for the designation and the selection that are performed by the user by means of the touch-sensitive surface 15. In the case of visual sensory feedback, the display of a first colour can be generated when the designation is effective, i.e. when the touch-sensitive surface 15 detects the presence of the finger 43 of the user placed on the touch-sensitive surface 15 in the position shown in FIG. 4a. A second colour is generated during a validated selection in the position shown in FIG. 4b.

In FIG. 4c, the user releases his press and the switch 17 toggles to its quiescent state. As described above, this release may be used for the validation of the selection via the comparison of the release force with the reference force Fref2 in order to check that the release is indeed intentional on the part of the user.

It is, for example, possible to check that no movement of the finger has been carried out between the two force measurements, corresponding to two toggles of the switch 17.

Figure 5:
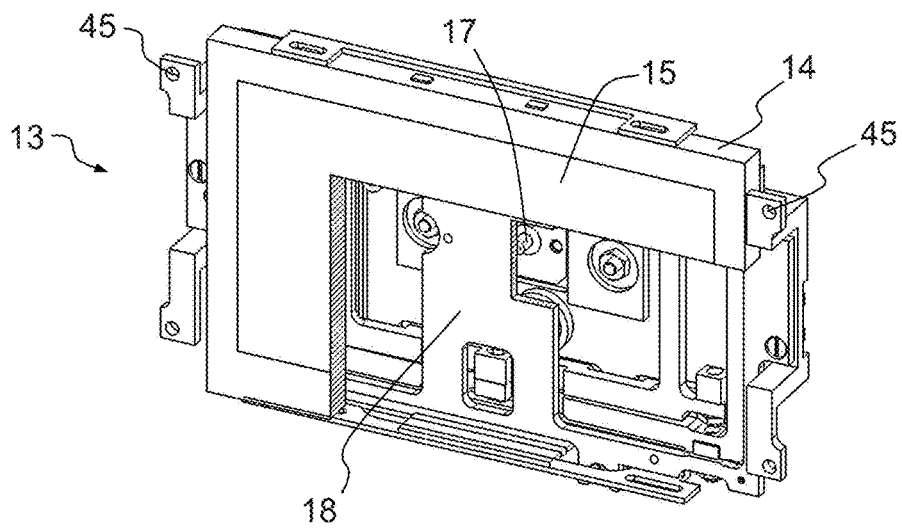
FIG. 5 shows an exploded perspective view of an example embodiment of the device shown in FIG. 1.

FIG. 5 shows an exploded perspective view of an example embodiment of the data input device 13. It shows the body 14, including, for example, means 45 for attachment to a work surface, the touch-sensitive surface 15, the switch 17 and pantograph 18.

The invention claimed is:

1. A data input device of a computer system, comprising:
   a screen having a touch-sensitive surface allowing a designation of an object displayed on the screen,
   a switch operable by a pressing of the touch-sensitive surface, an operation of the switch allowing a designated object to be selected,
   a sensor configured to measure a force applied to the touch-sensitive surface and to operate the switch, the sensor being independent from the switch,
   a comparator of a force measured by the sensor with a plurality of distinct reference forces, and
   a circuit configured to validate a signal originating from the switch according to results of comparisons carried out by the comparator between the measured force and the distinct reference forces, said circuit configured to validate the signal originating from the switch if a temporal sequence of the results of the comparisons with each of the distinct reference forces conforms with a reference temporal sequence.

2. The device according to claim 1, in which the designation of the object by the touch-sensitive surface applies a physical principle and the measurement of the force applies the same physical principle.

3. The device according to claim 1, further comprising:
   a position sensor configured to determine a position on the touch-sensitive surface, the device being configured so that another signal originating from the position sensor is processed not only to determine the position on the touch-sensitive surface but also to determine a corresponding force exerted on the touch-sensitive surface at the determined position.

4. The device according to claim 1, further comprising:
a circuit configured to calibrate reference forces according to another force measured during a toggling of the switch.

5. The device according to claim 1, wherein the comparator is configured to compare the force measured by the sensor with two distinct reference forces, one reference force corresponding to a toggling of the switch during the pressing of the touch-sensitive surface, and the other reference force corresponding to another toggling of the switch during a release of the pressing of the touch-sensitive surface.

6. The device according to claim 1, in which the distinct reference forces are defined according to a position of the pressing on the touch-sensitive surface.

7. The device according to claim 1, further comprising:
a feedback generator configured to generate sensory feedback to inform a user of a selection of the object, wherein the feedback generator is controlled by the circuit configured to validate.

8. The device according to claim 1, further comprising:
a body, the touch-sensitive surface being translationally movable in relation to the body, the switch being operable due to a translational motion of the body.

9. The device according to claim 8, further comprising:
a pantograph disposed between the body and the touch-sensitive surface in such a way as to transfer any force exerted perpendicular to the touch-sensitive surface towards the switch.

\* \* \* \* \*